Patented May 15, 1945

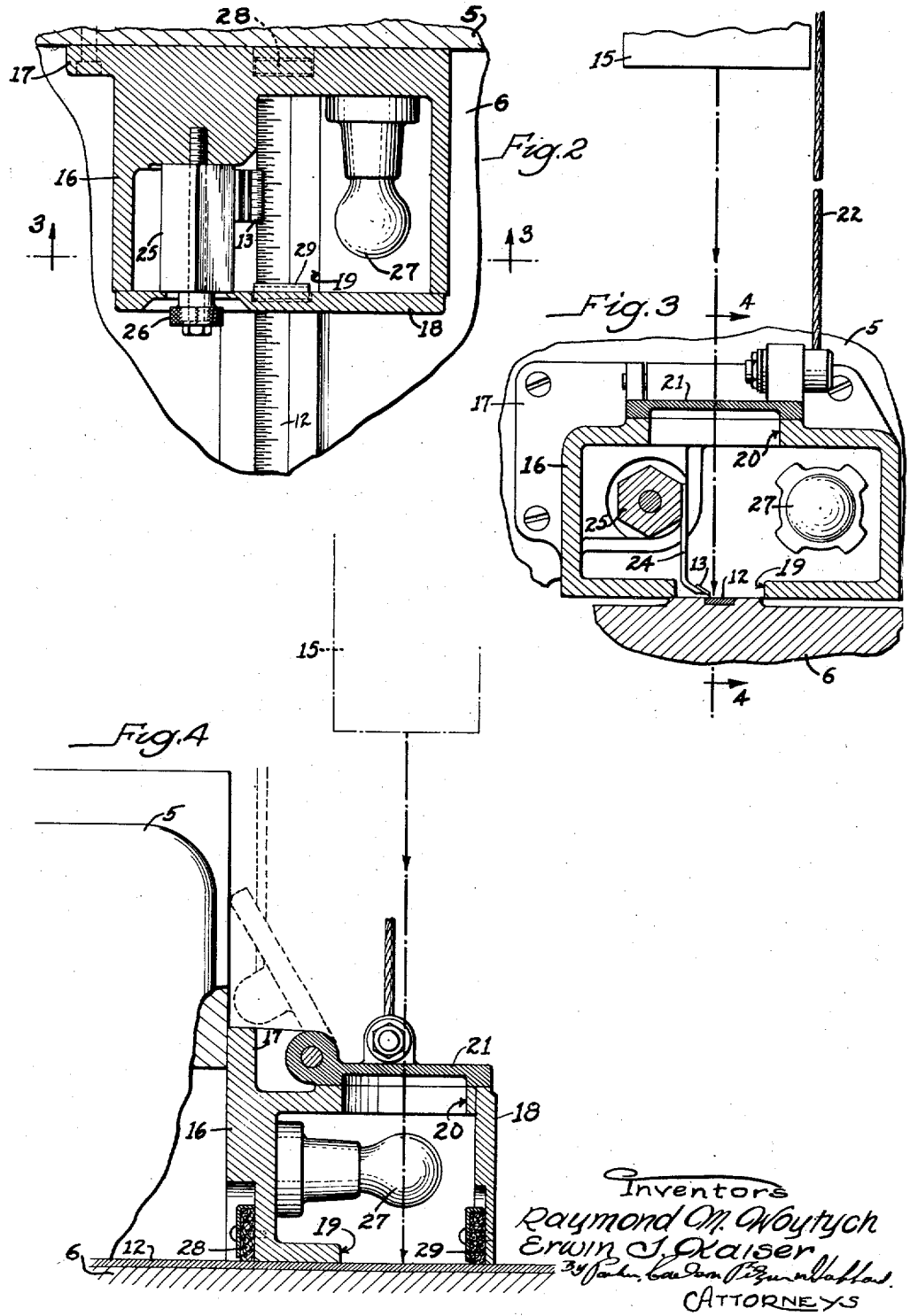

2,376,303

UNITED STATES PATENT OFFICE 2,376,303

MEASURING AND INDICATING APPARATUS FOR MACHINE TOOLS

Raymond M. Woytych and Erwin J. Kaiser, Fond du Lac, Wis., assignors to Giddings & Lewis Machine Tool Co., Fond du Lac, Wis., a corporation of Wisconsin Application March 24, 1943, Serial No. 480,296

6 Claims. (Cl. 29—26)

The invention relates to apparatus for measuring and indicating changes in the position of a movable machine tool element with respect to its supporting and guiding structure.

One object of the invention is to provide improved apparatus of the above general character particularly adapted for use with machine tools of very large size whereby a single operator or attendant is enabled to accurately determine the position of a remotely located movable machine tool element.

A more specific object is to provide measuring and indicating mechanism in which the position of the movable element is measured by means of cooperative marking devices or scales carried respectively by the element and its supporting structure and embodying means whereby the scales may be read with a high degree of accuracy from a remote point.

Another object is to provide novel means for protecting the delicate parts of the measuring apparatus from metal chips or other foreign materials and for maintaining them clean and readily available for visual inspection.

Other objects and advantages of the invention will become apparent from the following detailed description of the preferred embodiment, in which:

Fig. 2 is a sectional view taken in a horizontal plane substantially on the line 2—2 of Fig. 1.

Fig. 3 is a sectional view taken in a vertical plane substantially on the line 3—3 of Fig. 2.

Fig. 4 is a sectional view taken in a vertical plane substantially on the line 4—4 of Fig. 3.

Figure 1:
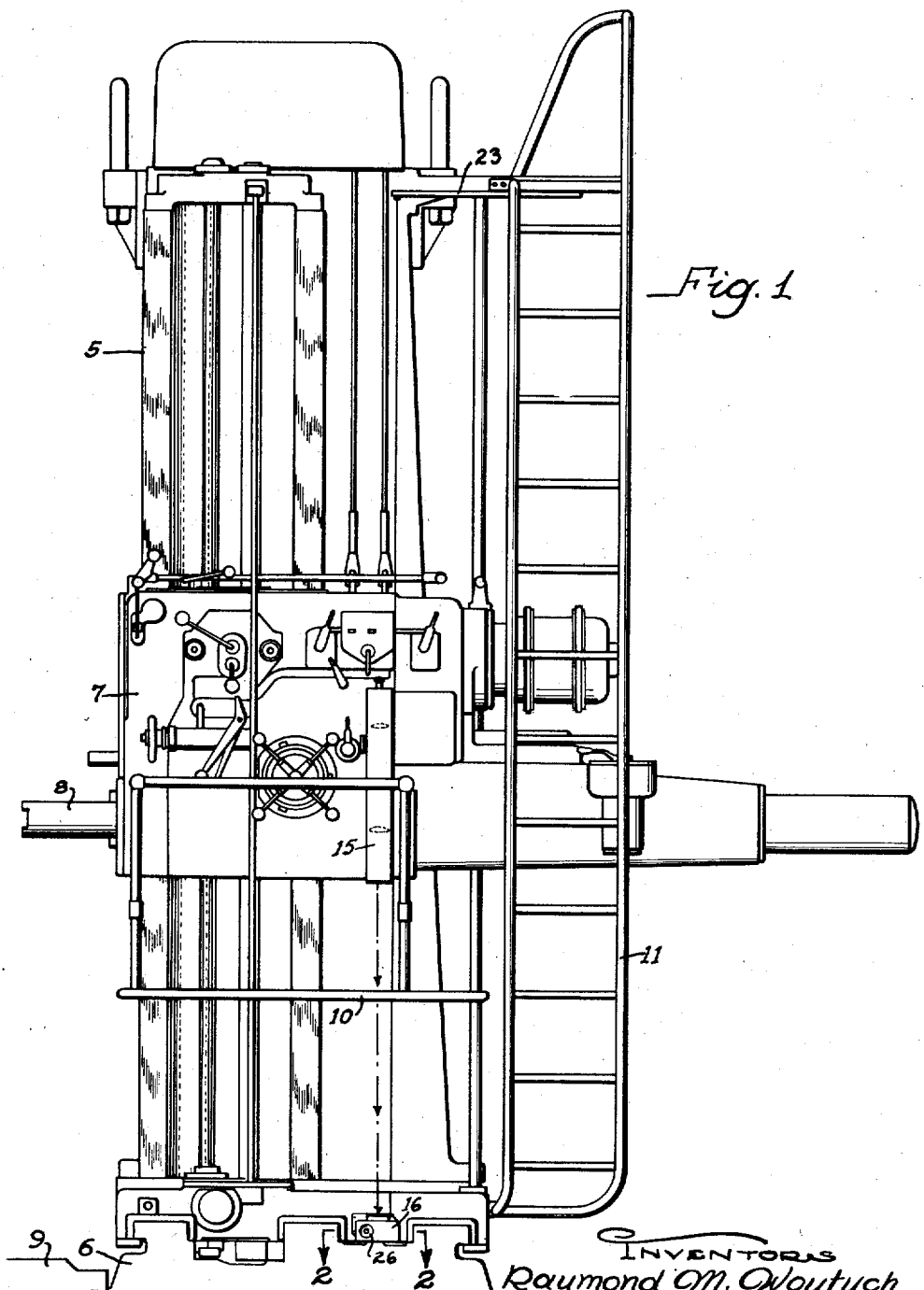
Figure 1 is a partial front elevational view of one type of machine tool equipped with measuring and indicating apparatus embodying the features of the invention.

For purposes of illustration the invention has been shown herein as embodied in a measuring and indicating apparatus applied to a horizontal boring, drilling and milling machine. It will be understood, however, that the invention is also applicable to other types of machine tools. It will also be understood that various changes and modifications may be made in the form, construction and arrangement of the parts without departing from the spirit and scope of the invention as expressed in the appended claims.

The machine tool selected to illustrate the use and operation of the present invention is a horizontal boring, drilling and milling machine of the type disclosed in the Gallimore Patent No. 2,251,015, granted July 29, 1941. Machines of this type have an upright headstock column 5 supported and guided for horizontal movement by ways formed on an elongated bed 6. Vertical ways on the column support and guide a headstock 7 having a rotatably driven spindle 8 adapted to carry a tool for operating on work supported on a table 9 located at one side of the bed. Power driven transmissions are provided for driving and feeding the tool spindle and for traversing the headstock and headstock column on their respective ways as described in the above-mentioned patent.

Machine tools of the above general character are commonly built in very large sizes, in some instances, providing as much as twelve or fifteen feet of vertical travel for the headstock. In such machines it has been found most efficient to locate the manual controls for the various transmissions at a central control station preferably on the headstock. A platform 10, reached by a ladder 11 on the side of the column, is suspended from the headstock so that the machine attendant can ride the headstock and thus keep in close touch with the work at all time while retaining full control of all machine functions through the medium of the controls on the headstock.

As illustrative of one situation in which the improved measuring and indicating apparatus can be used to advantage, the apparatus has been shown herein as arranged to measure the movements of the headstock column 5 along the bed 6 and to enable these measurements to be observed by an attendant stationed on the control platform 10. For effecting the required measurements, a pair of cooperating marking devices or scales are provided including an elongated graduated scale 12 extending longitudinally of the bed, and a shorter vernier scale 13 mounted on and movable with the column. The scales may be graduated to measure in any suitable units as for example, in thousandths of an inch. The vernier, of course, may be replaced by a simple pointer or the like if desired.

To enable the attendane to read the scales without leaving the control platform, a telescopic sighting device 15 is preferably mounted on the headstock 7 in vertical alinement with the vernier scale 13. The sighting device may be of any suitable type adapted to provide the magnification required for accurate reading of the scales and capable of being focused thereon in any position of the headstock. Since both the platform 10 and the sighting device 15 are secured to and move with the headstock, the sighting device is always conveniently accessible to the attendant who may thus observe the scales while manipulating the controls for traversing the headstock column along the bed. Accurate positioning of the column may thus be effected by a single attendant and with a minimum of effort and lost time.

Means is provided for protecting the vernier scale 13 from dirt and damage and for removing metal chips or other foreign material from the section of the scale under observation through the sighting device 15. To this end the vernier scale is enclosed in a suitable housing 16 attached to the base of the column 5 and overlying the scale 12. As shown in Figs. 2, 3 and 4, the housing is in the form of a hollow, generally rectangular metal casing having a laterally projecting flange 17 at its rear edge by which it may be bolted or otherwise rigidly secured to the base of the headstock column. The front end of the housing is closed by a removable cover plate 18 which provides access to the elements enclosed within the housing. A longitudinal slot 19 in the bottom wall of the housing exposes a section of the scale 12 for cooperation with the vernier scale 13. Preferably the scale 12 is imbedded in a longitudinal rib upstanding from the bed 6 and the upper surface of this rib may be accurately machined for engagement with the bottom wall of the housing thereby effectually sealing the housing against entry of metal chips or other foreign material.

To permit convenient visual inspection of the exposed section of the scale and the cooperating vernier scale 13 from above, the upper wall of the housing is formed with an opening 20 located directly above the scales as shown in Fig. 3. The opening is adapted to be closed by a hinged cover 21 when the apparatus is not under observation. A flexible cable 22 extending vertically along the front of the column between the cover 21 and a supporting bar 23 adjacent the top of the column provides convenient means whereby the attendant may move the cover to an open position whenever it is desired to observe the scales.

In the exemplary form of the apparatus, the vernier scale 13 is carried on a depending arm 24 (Fig. 3) adjustably supported in known manner on a hexagonal body member 25 rigidly mounted within the housing 16. Adjustment of the vernier longitudinally of the scale 12 is effected through the medium of an adjusting knob 26 accessible at the front of the housing as shown in Fig. 2.

Also mounted within the housing 16 is a suitable illuminating device such as an electric lamp 27 positioned to illuminate the exposed section of the scale 12 and the vernier 13 for convenient visual observation. The lamp may be turned on or off by a switch of any suitable type preferably accessible to the attendant while on the platform 10.

To remove metal chips or other foreign material from the section of the column 12 exposed within the housing 16, wipers 28 and 29 of felt or other suitable material are attached respectively to the rear wall of the housing and to the cover plate 19 in position to wipe over the scale as the column moves along the bed in either direction. In this way the material deposited on the scale is effectually removed from the section to be observed and, since this section is completely enclosed in and protected by the housing, the scale and vernier are maintained in a clean condition so that measurement indicated thereby may be accurately read at all times.

It will be apparent from the foregoing that the invention provides a measuring and indicating apparatus of novel and advantageous construction particularly suitable for use with very large machine tools. The position of a movable machine element is measured with precision by cooperating marking devices carried respectively by the element and by its supporting and guiding structure. One of the marking devices may conveniently take the form of a graduated scale extending in the direction of movement of the machine element while the cooperating marking device is preferably in the form of a vernier.

The scales employed may be of relatively small size such as are ordinarily used for precision measurements yet may be read with a high degree of accuracy from a remote point through the telescopic sighting device provided for this purpose. The sighting device is mounted on the machine structure in fixed relation to one of the scales, preferably the vernier scale, so that it is always readily available for determining the position of the movable machine element.

The invention also provides means for protecting more delicate parts of the apparatus from metal chips and other foreign material and for wiping accumulations of material from the section of the scale to be visually observed. The marking devices are accordingly maintained at all times in condition for precise measurement and indication of the position of the machine element.

We claim as our invention:

1. A machine tool having, in combination, a horizontally disposed elongated bed, an upright column supported for movement along the bed, a graduated scale carried by the bed, a vernier scale carried by the column for cooperation with said first scale to indicate the position of the column on the bed, a headstock supported on said column for vertical movement, said headstock having manually operable control devices for controlling the operations of the machine, a platform suspended from and movable with the headstock, and adjustable telescopic sighting means carried by said headstock in a position for viewing said scales, said sighting device and the control devices being conveniently accessible to an attendant standing on said platform.

2. A machine tool having, in combination, a horizontally disposed bed, an upright column supported for movement along the bed, a graduated scale fixed to the bed and extending in the direction of movement of said column, a vernier scale carried by the column for cooperation with said fixed scale to indicate the position of the column on the bed, manually operable control devices carried by the column for controlling the movements of the column on the bed, a telescopic sighting device located closely adjacent said control devices and in a position for viewing said scales, and a platform adapted to travel with the column, said platform being positioned to provide convenient access to the control devices and to said sighting device by an attendant standing thereon.

3. A machine tool having, in combination, a horizontally disposed bed, an upright column supported for movement along said bed, a graduated scale fixed to the bed and extending in the direction of movement of the column, a vernier carried by the column for cooperation with said scale to indicate the position of the column on the bed, a housing mounted on the column enclosing said vernier and overlying said scale, said housing having an opening in its bottom wall exposing a section of the scale and a second opening in its top wall for viewing the exposed scale section and said vernier, a headstock mounted on said headstock in vertical alinement and an adjustable telescopic viewing device mounted on said headstock in vertical alinement with the vernier and the second opening in the housing.

4. A machine tool having, in combination, a bed, a supporting member movable along said bed, a graduated scale carried by said bed and extending in the direction of movement of said member, a marking device mounted on said member in close proximity to said scale for cooperation therewith in indicating the position of the member on said bed, a machine element supported and guided on said member for movement transversely of the path of movement of the member, and a telescopic sighting device mounted on said machine element with its optical axis parallel to the path of the element and alined with said marking device and said scale, said sighting device being focusable on said scale in any position of said machine element.

5. In a machine tool, in combination, a stationary member, a first movable member supported and guided by said stationary member, a second movable member supported and guided by said first movable member, the paths of movement of said members being substantially at right angles to each other, a graduated scale carried by said stationary member, a marking device carried by said first movable member for cooperation with said scale to indicate the position of the last mentioned member, and a focusing type sighting device mounted on said second movable member for viewing said scale and said device.

6. In a machine tool, in combination, an elongated base, an upright column supported on said base for movement in a horizontal plane, a machine element adjustable vertically on said column, a graduated scale extending along said base generally parallel to the path of movement of said column, a marking device mounted on said column and positioned to cooperate with said scale to indicate the position of said column with respect thereto, and a telescopic sighting device mounted on said machine element for viewing said scale and said marking device, said sighting device being focusable on said scale and said marking device in various adjusted positions of said machine element on said column.

RAYMOND M. WOYTYCH.
ERWIN J. KAISER.

CERTIFICATE OF CORRECTION.

Patent No. 2,376,303. May 15, 1945.

RAYMOND M. WOYTYCH, ET AL.

It is hereby certified that error appears in the printed specification of the above numbered patent requiring correction as follows: Page 3, first column, line 3, strike out the words "said headstock in vertical alinement" and insert instead --the column for vertical movement,--; and that the said Letters Patent should be read with this correction therein that the same may conform to the record of the case in the Patent Office.

Signed and sealed this 2nd day of October, A. D. 1945.

Leslie Frazer

First Assistant Commissioner of Patents.

opening in its top wall for viewing the exposed scale section and said vernier, a headstock mounted on said headstock in vertical alinement and an adjustable telescopic viewing device mounted on said headstock in vertical alinement with the vernier and the second opening in the housing.

4. A machine tool having, in combination, a bed, a supporting member movable along said bed, a graduated scale carried by said bed and extending in the direction of movement of said member, a marking device mounted on said member in close proximity to said scale for cooperation therewith in indicating the position of the member on said bed, a machine element supported and guided on said member for movement transversely of the path of movement of the member, and a telescopic sighting device mounted on said machine element with its optical axis parallel to the path of the element and alined with said marking device and said scale, said sighting device being focusable on said scale in any position of said machine element.

5. In a machine tool, in combination, a stationary member, a first movable member supported and guided by said stationary member, a second movable member supported and guided by said first movable member, the paths of movement of said members being substantially at right angles to each other, a graduated scale carried by said stationary member, a marking device carried by said first movable member for cooperation with said scale to indicate the position of the last mentioned member, and a focusing type sighting device mounted on said second movable member for viewing said scale and said device.

6. In a machine tool, in combination, an elongated base, an upright column supported on said base for movement in a horizontal plane, a machine element adjustable vertically on said column, a graduated scale extending along said base generally parallel to the path of movement of said column, a marking device mounted on said column and positioned to cooperate with said scale to indicate the position of said column with respect thereto, and a telescopic sighting device mounted on said machine element for viewing said scale and said marking device, said sighting device being focusable on said scale and said marking device in various adjusted positions of said machine element on said column.

RAYMOND M. WOYTYCH.
ERWIN J. KAISER.

CERTIFICATE OF CORRECTION.

Patent No. 2,376,303. May 15, 1945.

RAYMOND M. WOYTYCH, ET AL.

It is hereby certified that error appears in the printed specification of the above numbered patent requiring correction as follows: Page 3, first column, line 3, strike out the words "said headstock in vertical alinement" and insert instead --the column for vertical movement,--; and that the said Letters Patent should be read with this correction therein that the same may conform to the record of the case in the Patent Office.

Signed and sealed this 2nd day of October, A. D. 1945.

Leslie Frazer

First Assistant Commissioner of Patents.